United States Patent Office 3,075,291
Patented Jan. 29, 1963

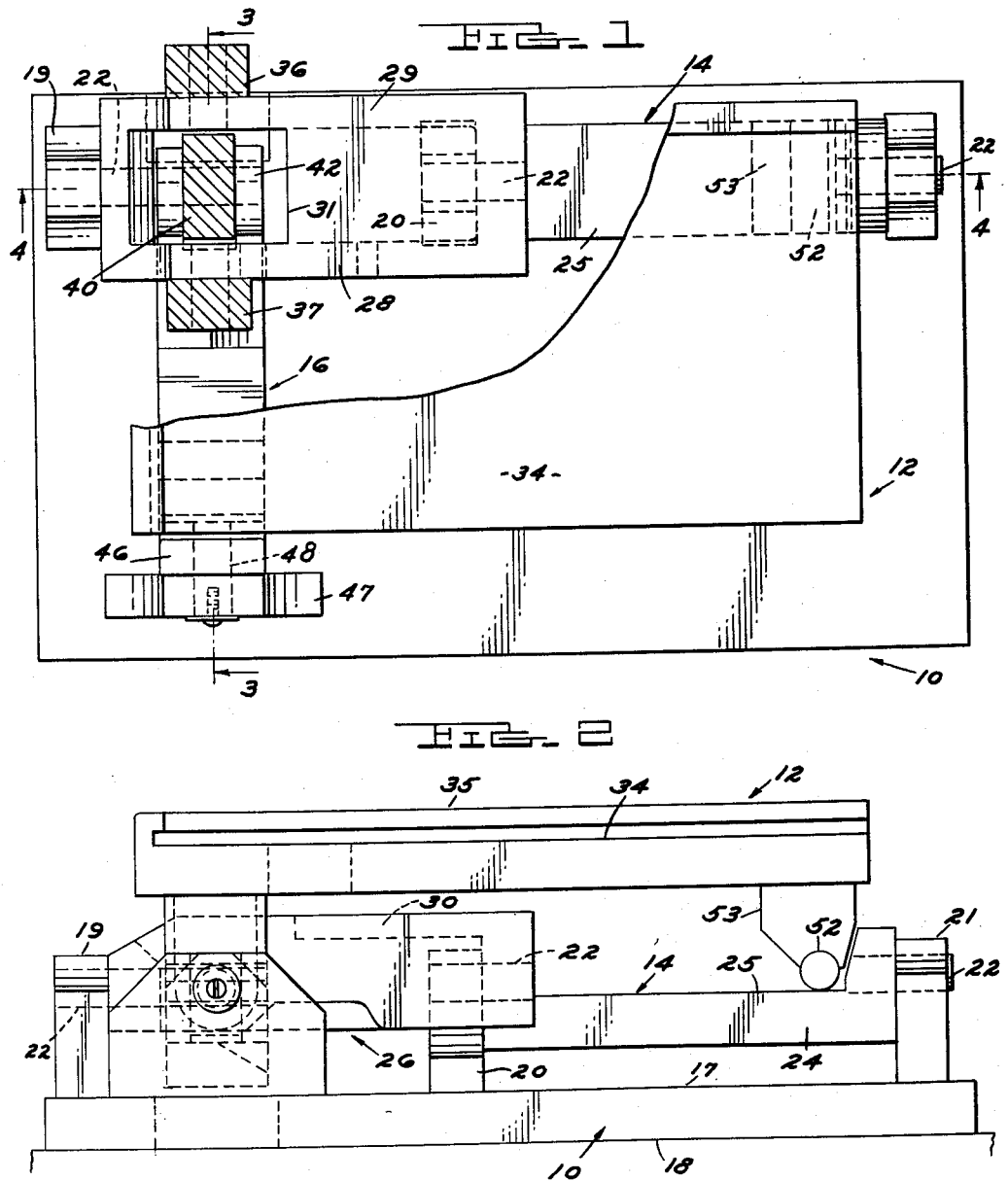

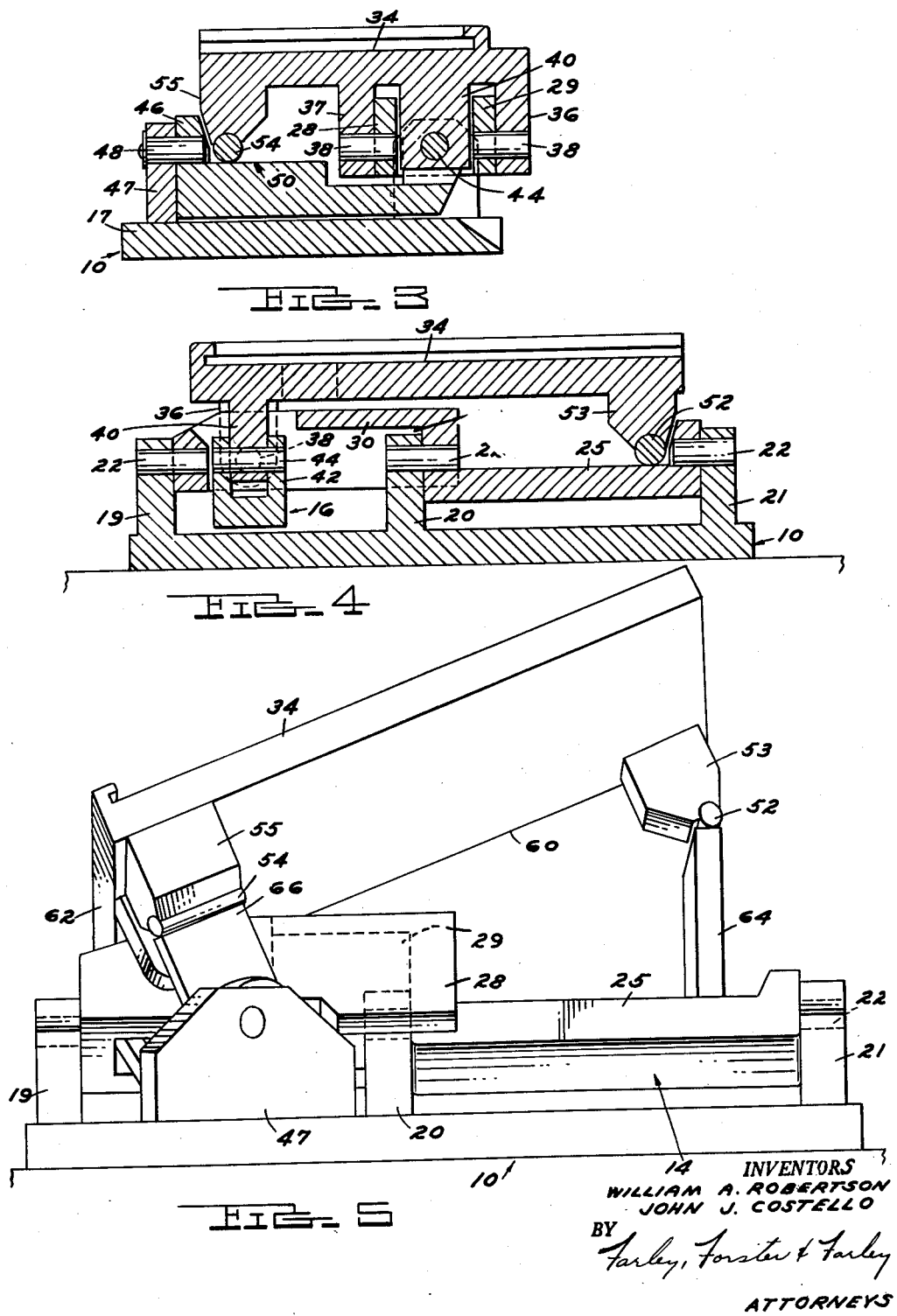

3,075,291
COMPOUND SINE PLATE
William A. Robertson, 110 Sterling Drive, Lapeer, Mich., and John J. Costello, 406 Hickory St., Linden, Mich.
Filed Nov. 1, 1960, Ser. No. 66,663
10 Claims. (Cl. 33—174)

This invention relates to an improved construction for a device having a surface or plate which can set to simple or compound angles with respect to a reference surface.

Devices of this type are employed in machining and gauging operations. They take the name "sine plate" due to the fact that the plate-like member having the planar surface which is moved to a desired angle is provided with a gauging point located a fixed distance from a pivotal axis about which the plate-like member is movable. This fixed distance, or "sine bar," when multiplied by the sine of the angle to which the plate-like member is to be moved gives a distance which varies with the angle and which can be readily set by means of gauge blocks mounted between the gauging point and a reference surface so as to extend in a plane perpendicular to both surfaces.

A compound sine plate is one whose plate-like member can be moved about two angles, these angles usually being specified or dimensioned relative to a common reference plane. Conventional compound sine plates include a plate-like member, a base member, and an intermediate member which is pivoted to the base member on one axis and pivoted to the plate member on an axis 90 degrees thereto. A compound angle is set by first setting the intermediate member with reference to the base member and by then setting the plate-like member with reference to the intermediate member, and hence a correct setting of the compound angle can only be obtained if one of the two angles is specified with reference to the base member and the second angle specified with reference to the setting of the intermediate member which results when the first angle is set. This type of dimensioning is not followed in ordinary practice. Instead, the compound angle is specified with reference to a common plane, and therefore it becomes necessary to recalculate the second angular setting. This is a problem beyond the ability of the average shop man and consequently many errors can result either from incorrectly figuring the second angular setting or from not realizing that a refiguring operation is necessary.

The present invention provides a construction in which the sine plate can be correctly set at a compound angle as specified with reference to a common plane without any refiguring operation. In other words, the two angles involved can be directly set as specified, and the device is characterized by the provision of a plate member, a base member, a universal connection therebetween and a pair of gauge supporting members, each gauge supporting member having a reference surface which is at all times positioned so as to be intersected by one of a pair of dimensioning planes which extend at right angles to each other and perpendicular to the plate member, regardless of the angular position thereof. Preferably these reference surfaces each consist of a planar surface which is at all times maintained at right angles to its dimensioning plane, thus facilitating the use of gauge blocks for setting the distance determined by the sine of the specified angle.

This characterizing relation between the gauge supporting members and the dimensioning planes may be obtained by mounting one of the supporting members for sliding movement on the base member about the center of the universal connection in response to movement of the plate member in both dimensioning planes. Preferably, each supporting member includes a plane gauge surface and the construction includes means for rocking this gauge surface of each supporting member with rocking movement of the plate about the universal connection so that gauge surface is always maintained perpendicular to a dimensioning plane.

In the example to be given herein, a bi-axial type of universal connection is employed, the axes of the connection being in the same plane and at right angles to each other, with one member of the universal being pivotally mounted on the base on one of the axes and pivotally connected to the other member of the universal on the other of the axes, this other member being rigidly carried by the plate. One of the gauge supports is incorporated in that part of the structure of the universal which is pivotally mounted on the base. One end of the second gauge support is pivoted to the plate on an axis which passes through the center of the universal at right angles to the axis connecting the plate to the universal. The other end of the second support is pivotally mounted for sliding movement on the top of the base member about the center of the universal.

The foregoing, as well as other features and advantages of the invention, will become more apparent from the description to follow of the presently preferred example shown in the accompanying drawings which consist of the following views:

FIGURE 1, a top plan view of a compound sine plate with a portion of the plate member broken away for the sake of clarity;

FIGURE 2, a side elevation of the device shown in FIG. 1;

FIGURE 3, a sectional elevation taken as indicated by the line 3—3 of FIG. 1;

FIGURE 4, a sectional elevation taken as indicated by the line 4—4 of FIG. 1;

FIGURE 5, a side elevation similar to FIG. 2 but showing the plate member set at a compound angle.

The construction shown consists of four main parts, a base 10, a plate 12 and a pair of members 14 and 16 intermediate the base and plate.

Base 10 is formed with parallel, plane upper and lower surfaces 17 and 18. Three members 19, 20 and 21 are secured to the base and project from the upper surface thereof to form a mounting bracket for the member 14.

Member 14 is connected by pivot pins 22 to each of the bracket members 19, 20 and 21, the pivot pins all having a common axis. The portion of the member between the bracket members 20 and 21 is provided with a gauge supporting surface 25, and the remaining portion 26 of the member 14, which forms part of the structure of a universal connection, is in the form of a box-like section including a pair of side walls 28 and 29 and a partial top wall 30 having a rectangular aperture 31 formed therein.

The plate 12 has a plane upper surface 34, and may be provided with side rails 35 and other means such as holes or a magnetic chuck (not shown) for mounting an article on the surface 34. A pair of brackets 36 and 37 best shown in FIGS. 1 and 3 depend from the plate and straddle the side walls 28 and 29 of the member 14 to which these brackets are connected by a pair of pins 38 on an axis which is parallel to the upper surface 34 of the plate and which intersects the axis of the pins 22 at right angles thereto. These brackets 36 and 37 thus form the part of the universal connection carried by the plate 12, and the intersection of the axes of the pins 22 and pins 38 defines the center of this universal.

Plate 12 is also provided with another depending bracket 40 which extends between the side wall portions 28 and 29 of the member 14 and is pivotally connected to the second member 16.

Member 16 has an upstanding clevis portion 42 which straddles the depending bracket 40 of the plate and is connected thereto by a pivot pin 44, the axis of which is concentric with the axis of the pins 22, is parallel to the upper surface 34 of the plate (FIG. 4) and passes through the center of the universal, intersecting the axis of the pins 38 at right angles thereto. Member 16 is pivotally connected at its other end 46 to a block 47 by a pivot pin 48. Block 47 is slidably supported on the upper surface 17 of the base and the axis of pivot pin 48 intersects the axis of the pivot pins 22. A gauge supporting surface 50 is provided on the member 16, this gauge surface extending perpendicular to a dimensioning plane perpendicular to the upper surface 34 of the plate, and being preferably located a distance below the axis of the pivot pin 48 equal to the distance at which the gauge surface 25 of the member 14 is located below the axis of the pivot pins 22.

The table 12 is also provided with two sine bars. One includes a cylindrical member 52 (FIGS. 2 and 4) carried by a member 53 depending from the table and cooperating with the gauge support 25 of member 14. The length of this sine bar is equal to the distance between the center of the member 52 and the axis of the pins 38. The second sine bar is formed by a similar cylindrical member 54 (FIG. 3) carried by a depending bracket 55 and cooperating with the gauge support 50 of member 16. The length of this sine bar equals the distance between the center of the member 54 and the axis of the pin 44.

By inserting a gauge block between the gauge support 25 and the member 52, the plate 12 can be tilted to any desired angle about the axis of the pivot pins 38 and this tilting movement will be accompanied by a rocking movement of the member 16, imparted thereto through the depending bracket 40 of the table engaging the clevis 42 of the member (see FIG. 4). This rocking movement maintains the gauge support surface 50 of member 16 perpendicular to a dimensioning plane. Likewise, the table can be tilted to any desired angle about the pivot pin 44 by inserting a suitable gauge block between the gauge support 50 of member 16 and the member 54 of the table. This tilting movement of the table results in corresponding rocking movement of the member 14 about its pivot pins 22, produced by engagement between the depending brackets 37, 36 of the table and the side walls 28, 29 of the member 14 (see FIG. 3). This rocking movement of the member 14 maintains its gauge support surface 25 perpendicular to a dimensioning plane.

When the plate 12 is set to a compound angle as shown in FIG. 5, tilting of the table about both of the pivotal axes 38 and 44 is accompanied by a swinging movement of the member 16 about the center of the universal connection. As a result of this swinging movement and the rocking movement described above, each gauge support 25 and 50 is maintained in a position where it can be intersected by one of a pair of dimensioning planes which are at right angles to each other and perpendicular to the face 34 of the table. In other words, referring to FIG. 5, one dimensioning plane perpendicular to the face 34 of the table along the edgeline 60 thereof will intersect the gauge support 25 of member 14. A second dimensioning plane at right angles to the surface 34 of the table along the edgeline 62 thereof will intersect the gauge support 50 of member 16. Due to the fact that the gauge support surfaces are rocked with the surface 34 of the table, they will lie at right angles to these dimensioning planes and a compound angle specified with respect to a single reference plane can be directly set by inserting suitable gauge blocks 64 and 66 between the gauge supports 25 and 50 and their respective sine bars.

Suitable means, not shown, may be employed in accordance with conventional practice in the construction of the sine plates for locking the plate 12 in any position to which it is set about either or both of its pivotal axes. Other refinements obvious to those skilled in this art would include the provision of alternate gauge surfaces to facilitate the setting of relatively small angles.

While a preferred embodiment has been described above in detail, it will be understood that numerous modifications might be resorted to without departing from the scope of the invention as defined in the following claims.

We claim:

1. A compound sine plate comprising a base, a plate member, a universal pivotal connection between said base and said plate member, and gauging means carried by said plate member and base for setting the extent of pivotal movement of said plate member about said universal connection in dimensioning planes which are perpendicular to each other and which are each perpendicular to the surface of said plate member, said gauging means including a gauge supporting member and means mounting said supporting member for sliding movement on said base about the center of said universal connection in response to movement of said plate member in both of said dimensioning planes.

2. A compound sine plate comprising a base, a plate member having a plane upper surface, means universally connecting said plate member to said base for pivotal movement about a pair of axes which intersect at right angles to define the center of said universal connection, one of said axes being parallel to said base and the other being parallel to said plate, a pair of gauge supporting members, means pivotally mounting one of said supporting members on said base on an axis which intersects the center of said universal connection, and means pivotally connecting the other of said supporting members to said table on an axis which intersects said universal connection.

3. A compound sine plate according to claim 2 wherein said gauge supporting members each include a gauge surface, and means for rocking said gauge surface in response to pivotal movement of said plate member relative to the other of said supporting members.

4. A compound sine plate according to claim 2 further characterized by means for producing sliding movement of said other supporting member on said base about the center of said universal connection in response to movement of said table member about both axes of said universal connection, and a gauge surface on said other supporting member whereby a gauge dimension from said gauge surface to the plane of said table is at all times normal thereto.

5. A compound sine plate comprising a base, a plate member having a plane upper surface, a universal coupling between said plate member and said base, a pair of gauge supporting members, means mounting said pair of supporting members on said base, said mounting means including means for slidably moving one of said supporting members on said base about the center of said universal connection in response to movement of said plate member about said center in two dimensioning planes.

6. A compound sine plate comprising a base, a plate member having a plane upper surface, a pair of gauge supporting members, a universal connection between said plate member and said base, a pair of gauge points located on said plate member in right angular relation to the center of said universal connection, a gauge surface on each of said supporting members, means mounting said pair of supporting members on said base, said mounting means including means for slidably moving one of said supporting members on said base about the center of said universal connection in response to movement of said plate member about said center in a pair of dimensioning planes which are perpendicular to each other and perpendicular to the surface of said plate member, whereby each of said supporting member gauge surfaces is intersectable by one of the pair of dimensioning planes.

7. A compound sine plate according to claim 6 wherein each of said supporting member gauge surfaces is a plane, and wherein said means for mounting said pair of supporting members includes means for mounting each gauge surface for rocking movement about an axis which intersects the center of said universal connection, and means for producing such rocking movement of each of said gauge surfaces in response to movement of said plate member about said center whereby each of said gauge surfaces is maintained in normal relation to its dimensioning plane.

8. A compound sine plate according to claim 6 wherein said means for producing rocking movement of each of said gauge surfaces includes means pivotally connecting each of said supporting members to said plate on axes which are parallel to said plate and which intersect at the center of said universal connection.

9. A compound sine plate according to claim 8 wherein the means for connecting one of said supporting members to said plate includes a portion of the structure of said universal connection.

10. A compound sine plate comprising a base, a plate, a biaxial universal connecting means between said base and plate, said connecting means including one member pivotally mounted on said base and another member rigidly carried by said plate and pivotally connected to said one member, a gauge support pivotally movable with said one member of said universal connection, a second gauge support, means pivotally connecting one end of said second gauge support to said plate on an axis which passes through the center of said universal connection at right angles to the axis of the said connection between said plate and said one member of said universal connection, and means slidably and pivotally mounting the other end of said second supporting member on said base.

References Cited in the file of this patent
UNITED STATES PATENTS

| | | |
|---|---|---|
| 2,306,227 | Seidel | Dec. 22, 1942 |
| 2,351,773 | Lovenston | June 20, 1944 |